United States Patent [19]

Brown

[11] E Patent Number: Re. 33,061

[45] Reissued Date of Patent: Sep. 19, 1989

[54] TWO-OUT BELT SYSTEM

[75] Inventor: Omar L. Brown, Kettering, Ohio

[73] Assignee: Dayton Reliable Tool & Mfg. Co., Dayton, Ohio

[21] Appl. No.: 54,549

[22] Filed: May 27, 1987

Related U.S. Patent Documents

Reissue of:

[64] Patent No.: 4,568,230
Issued: Feb. 4, 1986
Appl. No.: 610,446
Filed: May 15, 1984

[51] Int. Cl.[4] ..... B21D 51/44

[52] U.S. Cl. ..... 413/66; 413/14

[58] Field of Search ..... 72/361, 405, 346, 422; 413/12, 14, 62, 64, 66, 56

[56] References Cited

U.S. PATENT DOCUMENTS

| | | | |
|---|---|---|---|
| 3,196,817 | 7/1965 | Fraze | 413/66 |
| 3,245,370 | 4/1966 | Bofinger | 413/64 |
| 3,366,086 | 1/1968 | Fraze et al. | 413/14 |
| 3,470,837 | 10/1969 | Fraze et al. | 413/66 |
| 3,550,546 | 12/1970 | Eickenhorst | 413/64 |
| 3,683,834 | 8/1972 | Potts et al. | 413/66 |
| 4,026,226 | 5/1977 | Hahn et al. | 72/405 |
| 4,208,976 | 6/1980 | Stelter et al. | 413/14 |
| 4,341,498 | 7/1982 | Ellis | 413/9 |
| 4,455,114 | 6/1984 | Zysset | 413/67 |
| 4,546,873 | 10/1985 | Debenham et al. | 198/836 |

*Primary Examiner*—Frederick R. Schmidt
*Assistant Examiner*—Robert Showalter
*Attorney, Agent, or Firm*—Biebel, French & Nauman

[57] ABSTRACT

A press for converting ends for cans and the like is provided with a conveyor extending sideways through the press to carry shells for processing into can ends along an end converting path. Upper and lower conversion tooling is located along the end converting path at the top and bottom of the conveyor, defining a plurality of stations on opposite sides of the center of the tooling for working progressively on shells moved by the conveyor along the end converting path. First and second tab tooling, auxiliary to the main tooling means, is located on opposite sides of the conveyor extending transversely thereof and defining a tab forming path which bridges the end converting path. Opening tabs are formed from a strip of metal stock fed through the tab tooling and the strip with completed tabs is guided in a loop from the tab tooling back to a staking and attachment station on the end converting path for removal from the strip and attachment to the shells. The tooling is mounted to the press bed and slide such that the converting and tab forming paths are arranged in a symmetrical fashion which distributes reaction forces in a generally uniform manner over the opposed working areas of the bed and slide.

12 Claims, 11 Drawing Sheets

TWO-OUT BELT SYSTEM

Matter enclosed in heavy brackets [ ] appears in the original patent but forms no part of this reissue specification; matter printed in italics indicates the additions made by reissue.

BACKGROUND OF THE INVENTION

This invention relates to press apparatus and tooling therefore used to convert the shells for self opening cans and the like. Such presses have been known for many years, and typically come in a range of sizes which are designated by tonnage, specifying the predetermined pressure that the press is designed to produce in consecutive pressing operations. However, a press of a given tonnage may in fact exceed its design limits for short periods of time during its operation. Also, the tooling for the press may be so designed that while momentary pressures exceed the designed tonnage, the pressure peaks are the result of the interaction of tooling in a minor part of the available bed-ram area of the press. However, continued such overloading may result in severe and/or premature wear, and to prevent such wear it is advisable to operate within design limits, and to seek optimum production through other means.

A sequence of preparing can ends, complete with scoring and attached tab for opening the end, is described in Fraze U.S. Pat. No. 3,366,086 issued Jan. 30, 1968. This patent discloses the typical steps for creating the can end, creating the tab, making the integral rivet connection between the tab and the end, and passing the completed end to an apparatus where the can body is filed and the end is attached.

U.S. Pat. Nos. 3,470,837 issued Oct. 7, 1969 and 3,550,546 issued Dec. 29, 1970 illustrate tooling and related apparatus for high production manufacturing of can ends in a typical single action press, where one completed end is discharged from the press for each complete press cycle. Typical of such designs, intermittently rotating carriers are provided, indexed step wise in coordination with the press cycle, to perform the sequence of operations in making the completed can end. Many such apparatus are in commercial use, and a typical press for that purpose is the Minster P-2 45 press, manufactured by Minster Machine Company, Minster, Ohio, U.S.A. Thus presses of this type are currently available on the used machinery market, thus the opportunity exists to modernize such existing single acting presses which, subject to replacement of bearings, drives, etc. are capable of many additional years of use.

More recently, there have been commercial installations of larger conversion presses wherein a two-lane conveyor belt extends from to back of the press, through in-line conversion tooling. Cooperating with the conveyor are up-stacker and down-stacker mechanisms located in front of and rearward of the slide, to carry a double lane of shells through the tooling in this press. The shells are received in circular apertures in the stainless steel conveyor belt, which is moved stepwise through the press in synchronism with the opening and closing of the tooling. To one side of this conveyor mechanism there is conventional in-line progressive tab tooling to form tabs from a metal strip which enters the press from one side.

Such presses provide two-out capacity, but the tooling is arranged in such fashion that the entire set of tab tooling is to one side of the center of the press, and a substantial off-center or asymmetric loading exists on the slide.

The present invention, therefore, deals with the provision of modern balanced tooling for the production of can ends with a high degree of efficiency, and also to a design with such balanced style of tooling heretofor not achieved. Can end manufacturers are thus able to renovate existing capital equipment, or to purchase new or renovated equipment having the improved manufacturing techniques.

SUMMARY OF THE INVENTION

The present invention provides apparatus which maximizes use of the design tonnage capacity for a particular press, and thus makes higher output available from new equipment, and also enables the renovation of existing presses, particularly single acting presses, within their design tonnage capabilities. The present invention also provides novel upper and lower tooling for a reciprocating press used to convert shells into easy opening can ends.

Particularly in presses used for production of self opening or easy-opening can ends, the material and the work has been arranged to flow from front to back of the press. This terminology is used with reference to a press having a rectangular bed and ram of substantially greater width than depth, and the front to back flow of the material in process is described with reference to motion generally transverse to the greater width dimension of the press.

In accordance with the present invention the shells being converted to ends, contrary to most previous arrangements, flow from side to side, or transversely to the depth dimension of the press. The depth dimension is sufficient that the path can be made wide enough to accommodate two working paths or lanes, side by side. A conveyor belt, having apertures for supporting the shells from which the ends are made, is mounted to extend width-wise of the press, for example from outside one side frame to outside the other side frame, carryign the parts in step-wise fashion through the press throat between the slide and the bed. The arrangement of the tooling is such that operations formed on the shells prior to attachment of the tabs, and operations performed in tab attaching and subsequent to such attachment, can be roughly divided into two equal series of steps or stations arranged on opposite sides of the center of the press.

The tooling for the manufacture of the tabs from strip material is arranged approximately along the center of the press, extending front to back, and the tab forming progression is preferably arranged in about the same number of steps on opposite sides of the approximate center of the press. The complete tabs, still carried attached to the strip, are then looped back into the throat of the press to the station at which the tabs are attached, e.g. staked, to the partially completed ends.

Thus the primary object of the present invention is to provide a balanced design of tooling wherein the steps of forming the ends prior to and subsequent to tab attachment are divided side to side or width wise of the throat of the press, and the tab forming steps are divided into two sections essentially equal front to back along the center line of the press; to provide such a novel tooling system as a result of which the load imposed by such tooling on the slide and bed, and the rest of the press mechanism, is essentially equally distributed over the rectangular area of the cooperating slide and bed; and to provide a novel tooling system for easy open ends in which the resulting improved distribution of forces enables an optimum integrated load, as a result of which a press of nominally lower tonnage is capable of substantially higher output.

Other objects and advantages of the invention will be apparent from the following description, the accompanying drawings and the appended claims.

DESCRIPTION OF THE PREFERRED EMBODIMENT

Press Drive Layout

Figure 2:
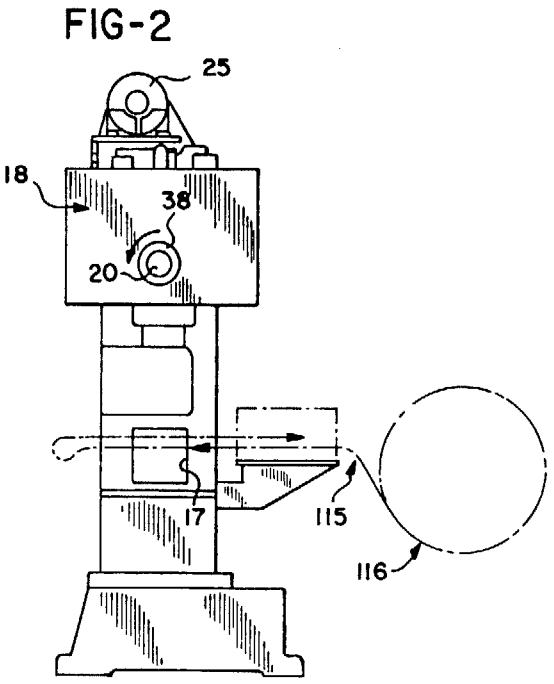
FIGS. 1 and 2 are front and side overall views of the press.
Figure 1:
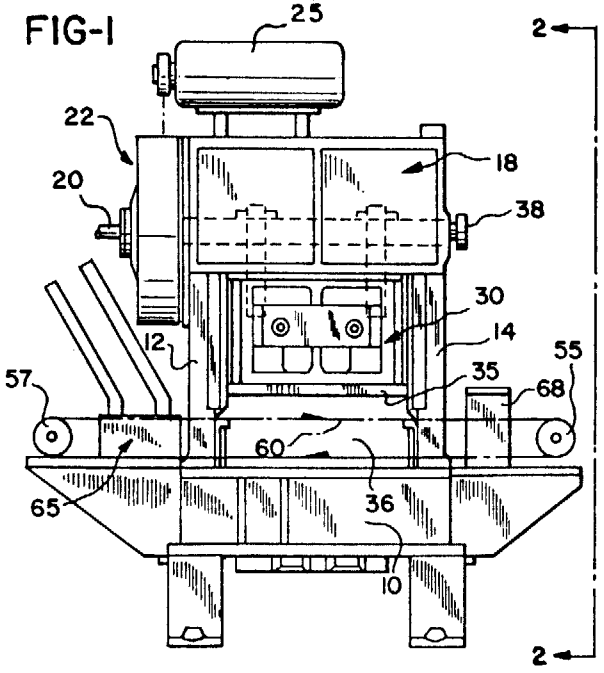
Figure 6:
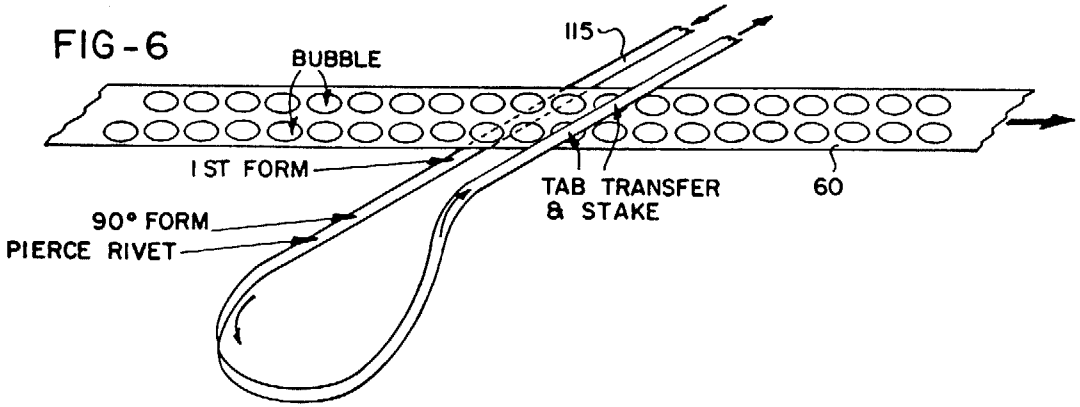
FIG. 6 is a perspective type schematic diagram showing the arrangement of the tab forming and end forming paths in the press.

FIGS. 1, 2 and 6 show, respectively, the overall configuration of a press in accordance with the invention, and the general arrangement of the progressive tooling to work upon shells, form completed tabs from a strip of material, and attach these tabs to complete the manufacture or conversion of the shells into ends for cans and similar containers.

Figure 3:
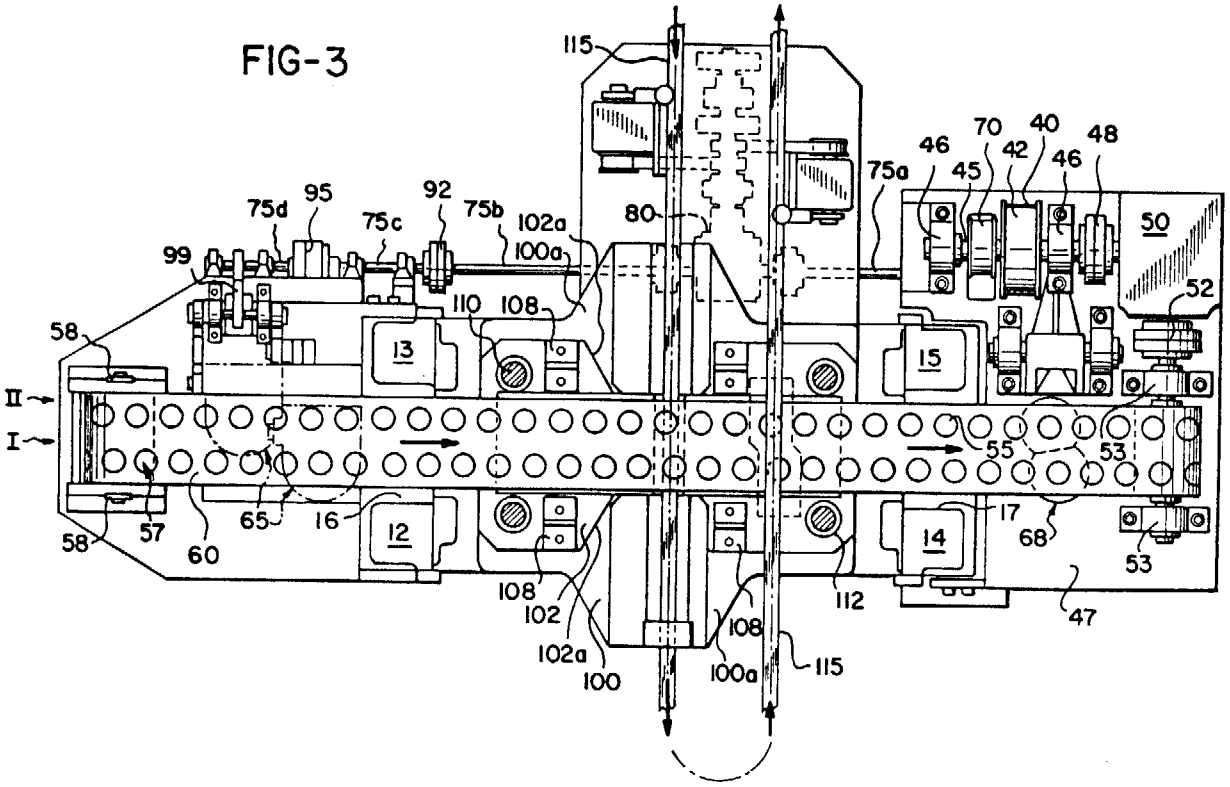
FIG. 3 is a plan view of the conveyor belt and related parts of the press, taken generally along line 3—3 in FIG. 4.

For purposes of this description the press illustrated in FIGS. 1, 2 and 3 is typical of a 45 ton single acting press, and includes a bed 10, side frames including uprights 12, 13, 14 and 15 surrounding side openings 16 and 17, and a crown 18 supported on the side frames. The crank 20 is rotatably supported in the crown, and has secured to it a flywheel 22, and is belt-driven by a drive motor 25 supported on top of the crown structure. The crank is connected to the slide 30 by a pair of connecting rods (not shown), and in conventional fashion cooperative upper and lower tooling sets indicated by the general reference numerals 35 and 36, are mounted on the slide and on the bed respectively. At the opposite side of the press from the flywheel, the crank 20 is fitted with a power take-off pulley 38.

Figures 4, 5:
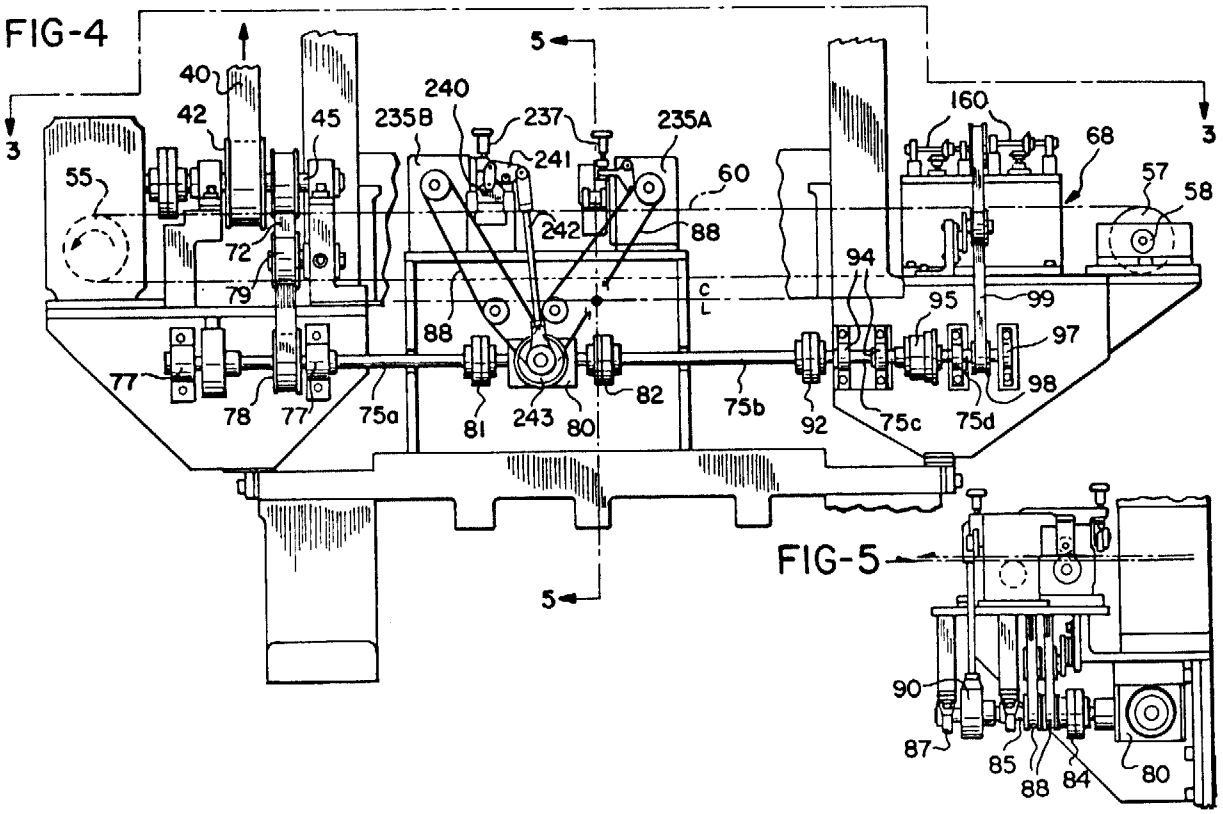
FIG. 4 is an enlarged view of the rear of the press, showing details of indexing drives for the conveyor belt, the tab strip, the up-stacker and down-stacker mechanism.
FIG. 5 is a view taken on line 5—5 in FIG. 4 showing further detail of the strip indexing feed.

Referring to FIGS. 3, 4 and 5, a belt 40 transfers power from the crank pulley 38 to a pulley 42 connected to drive a shaft 45 which is mounted in suitable bearings 46 supported outboard from the uprights or posts 14 and 15 which are part of the right hand side frame of the press (as viewed from the front). Shaft 45 is connected via a clutch 48 to a right angle intermittent drive unit 50, of ocnventional construction, which in turn is connected through an output clutch 52 to a shaft 53 supported in bearings 54 and carrying a drive drum 55 which is rotated in timed intermittent fashion, synchronized with the rotation of the crank 20, and therefore with the motion of the press slide 30. At the other (or left) side of the press, outboard of the side frame and posts 12, 13, an idler drum 57 is supported in suitable bearings 58, and extending between the drums 55 and 57 is a conveyor belt 60.

This belt is of the endless type, made preferably of material such as thin stainless steel, and is provided with two rows or paths of regularly spaced carrier openings 62. These openings are of a diameter such that the lip of a shell overlaps the edge of the openings, and thus shells deposited on the belt cover each of the openings and are carried by the belt through the tooling, in intermittent or step-wise fashion, synchronized to the operating strokes of the press. Shells to be converted are loaded onto belt 60 at the loading station indicated by general reference numeral 65 in FIG. 3, and the shells, now converted into finished ends, are unloaded from belt 60 at the unloading station indicated by the general reference numeral 68. The loading and unloading mechanisms, described later in detail, are also referred to in the art as a down-stacker mechanism and an up-stacker mechanism, referring to the manner in which these mechanisms remove single shells from the bottom of a supply stack thereof and place a single shell onto an opening in the belt, and at the discharge location, remove the finished ends and pass them upwardly into a stack thereof.

The power takeoff shaft 45 also is fitted with a pulley 70 that is connected via belt 72 to a further shaft 75 extending across the rear of the press bed. This shaft in actuality comprises several sections, the first of which 75a is supported in bearings 77 and has a pulley 78 thereon driven by belt 72. The pulley 79 immediately above pulley 78 is an adjustable idler for the purpose of keeping proper tension in belt 72. Shaft section 75a is connected through coupling 81 to the input of a right angle gear drive unit 80, and through that unit and a further coupling 82 to the shaft section 75b. A further coupling 84 (FIG. 4) is connected to the right angle output of gear box 80, to drive a shaft 85 which is supported in depending bearing mounts 87. The shaft 85 drives a pair of pulleys 88, and also drives an eccentric 90. The purpose of these driven items is explained hereafter.

Shaft section 75b is connected by a further coupling 92 (FIGS. 3 and 4) to another shaft section 75c which is supported in suitable bearings 94, and this shaft section in turn drives a final shaft section 75d through an overload friction-type clutch 95. The final shaft section 75d is supported in bearings 97 below and rearward of the discharge station 68, and a pulley 98 and belt 99 provide power to that station.

Tooling Layout

Figure 8:
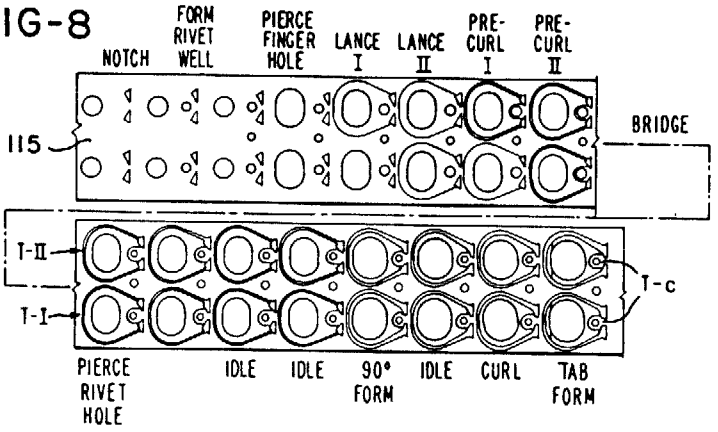
FIG. 8 is a view showing the progressive steps in forming tabs from a strip of materials.
Figure 9:
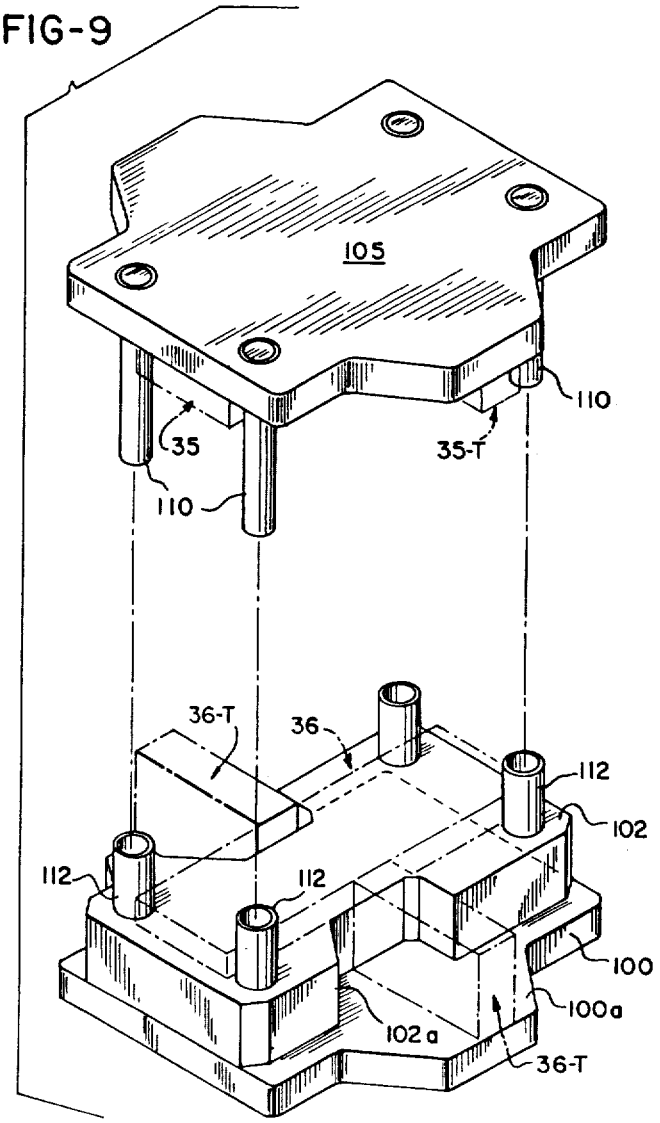
FIG. 9 is an exploded perspective view of the tooling and supporting members.

FIGS. 3, 6, 8 and 9 illustrate details of the unique upper and lower tooling sets 35, 36 which are provided in accordance with the invention. With reference to FIG. 3 and FIG. 9, the lower tooling set includes a subplate 100 upon which is secured a die shoe 102. The subplate is secured to the press bed by suitable fasteners (not shown) including precision locating pins in 104 and bushings 105 (FIG. 8) and are dimensioned to fit centrally between the side frames on the press, between and below the side openings 16 and 17. The subplate and die shoe at opposite sides have the same general rectangular end configuration, but at the center the subplate includes outwardly extending parts or extensions 100a both frontward and backward of the bed, while the die shoe is provided with niches 102a in generally corresponding locations.

The punch holder plate 105 is fastened to the bottom surface of the slide 30 and corresponds in outline shape to the subplate 100. The die shoe and the punch holder plate are provided with cooperating stop blocks 108 which provide limits for the close position of the tooling (in known manner) and the punch holder plate is fitted with four guide rods 110 arranged generally near the four corners of the rectangular parts of the tooling, and extending downward into receiving posts or sockets 112 fitted to the die shoe and including suitable precision ball bearing guides (not shown) which assure the necessary high accuracy of interfit between the upper (punch) and lower (die) tooling parts.

Conventional end conversion tooling is mounted on the die shoe, defining a plurality of stations arranged in two lanes, corresponding to the lanes of coveyor 60. Corresponding upper or punch tooling is mounted to the underside of the punch holder plate 105, thus shells placed in the apertures of the conveyor are carried progressively to the succeeding stations of the end conversion tooling by each step-wise movement of the conveyor. The end converting path thus defined extends from side to side of the press and the end conversion stations are laid out on the die shoe and punch holder plate in such fashion that they are generally symmetrically disposed with respect to the side to side and front to back center lines of the press, thereby equilibrating to a considerable extent the forces not heretofor achieved on the bed and slide.

In similar fashion, the subplate 100 and the punch holder plate 105 are fitted with tab forming tooling 35-T and 36-T which extend transversely of the end conversion tooling, in a direction generally front to back of the press, such tab conversion tooling being divided into first and second parts each of which consists of cooperating punch and die members, and which are supported on the extensions 100a and 105a of the subplate and punch holder plate respectively. Because of the height of the tab conversion dies, these are mounted to the subplate and fitted within the niches 102a of the die shoe 102. The path defined by the tab forming tooling is located on the front-back center line of the press, thereby also equilibrating the reaction forces on the slide and bed produced by operation of the tab forming tooling.

Figure 7:
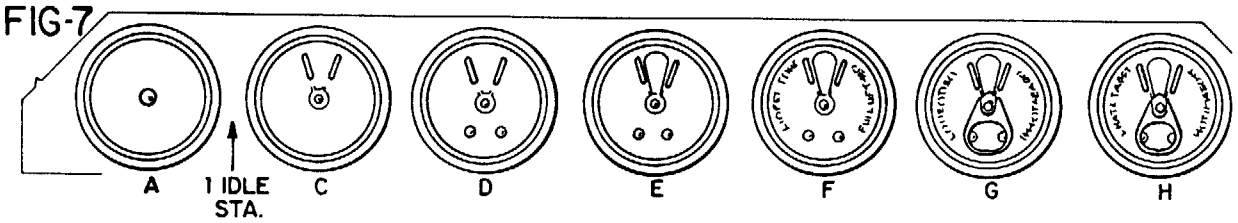
FIG. 7 shows the successive steps performed by the end conversion tooling.

Referring to FIGS. 3, 6 and 7, the end conversion tooling stations are disposed in lanes I and II and are identified as:

| | |
|---|---|
| bubble stations | I-A and II-A |
| idle stations | I-B and II-B |
| button station | I-C and II-C |
| forming station | I-D and II-D |
| idle station | tab die bridge |
| score station | I-E and II-E |
| lettering station | I-F and II-F |
| transfer/stake station | I-G and II-G |
| doming station | I-H and II-H. |

FIG. 7 shows, with a series of progressive views of an end from which the idle station is omitted, the conventional operations performed at those stations. Details of the individual punches and dies are not shown since these will vary with any particular installation, and they are not necessary for an understanding of the present invention.

FIG. 8 shows the progressive steps in forming tabs from a strip 115 of suitable material, such as aluminum, which is fed from a supply roll 116 (FIG. 2) along the tab forming path and then through the transfer/stake stations I-G and II-G. The tab forming tooling extends to the front and back of the end conversion tooling, as mentioned, and the completed tabs remain attached to the strip as it is looped back to the transfer/stake station (see FIGS. 3, 6, 10 and 19). There the tabs are removed from the strip, attached to the ends, and the remainder of the strip proceeds to scrap collection. Again, details of the tab forming tooling are not shown since they will vary with the type of end being made, and they are not necessary for an understanding of the invention.

Figure 10:
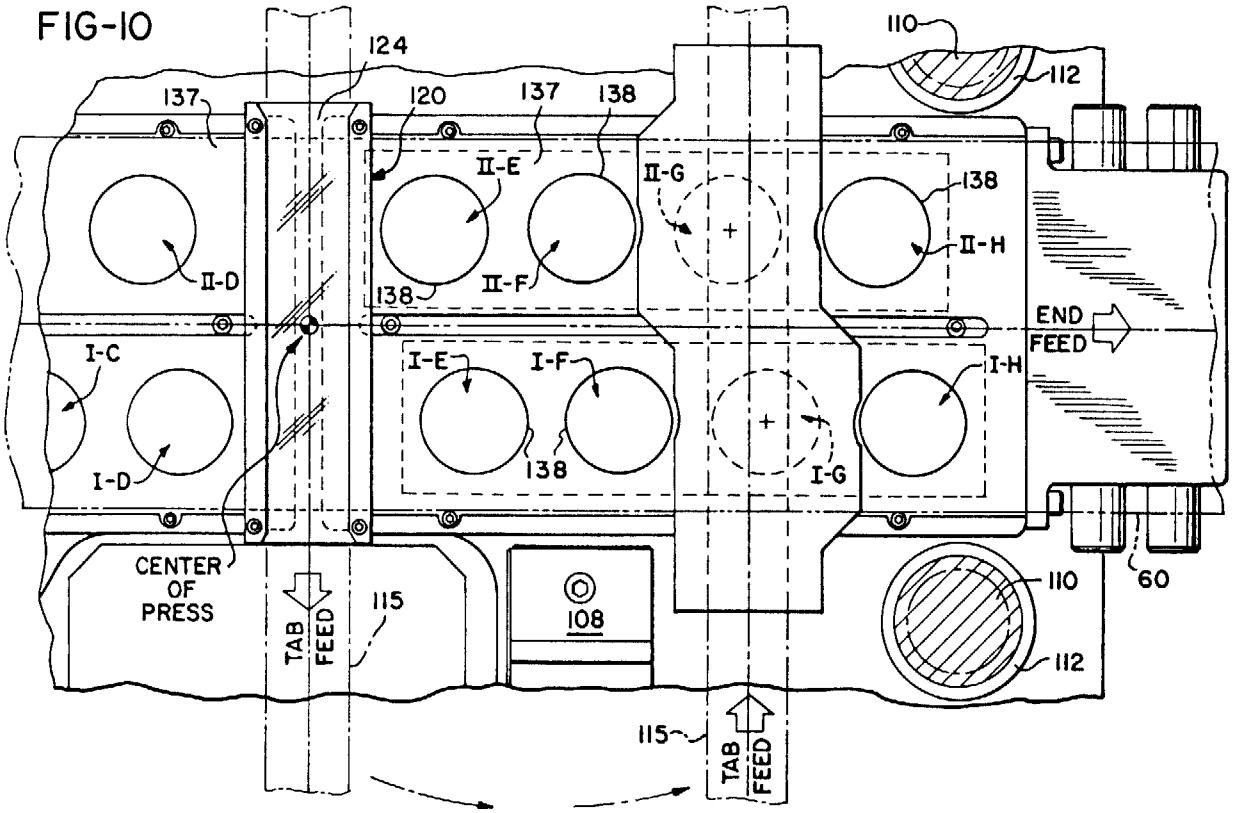
FIG. 10 is a plan view of one of the vacuum boxes associated with the lower tooling and located beneath the conveyor belt, and also showing the tab strip bridge across the end conversion tooling.
Figure 12:
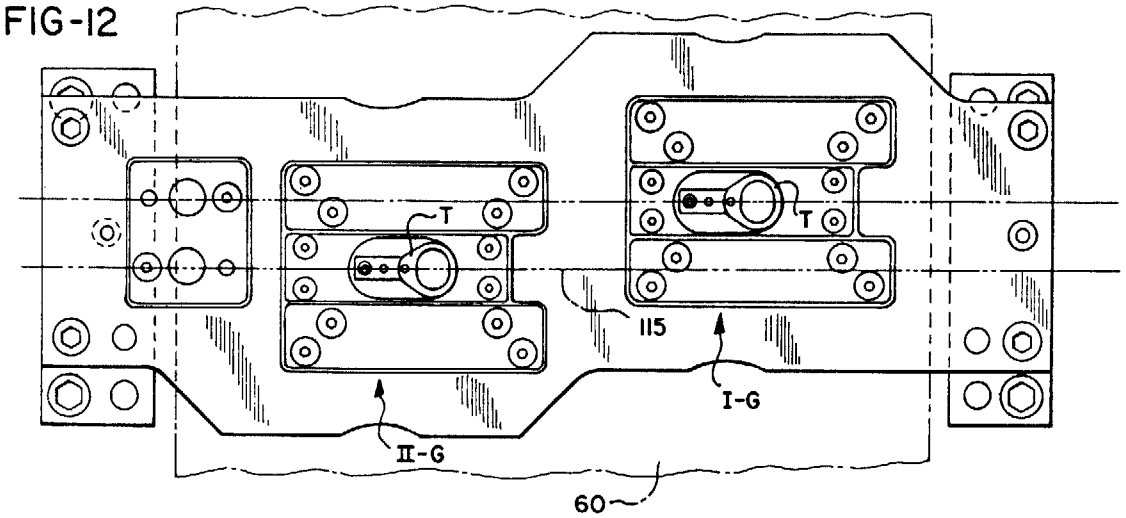
FIG. 12 is a detail plan view of the tab transfer and staking stations where tabs are joined to the ends.
Figure 19:
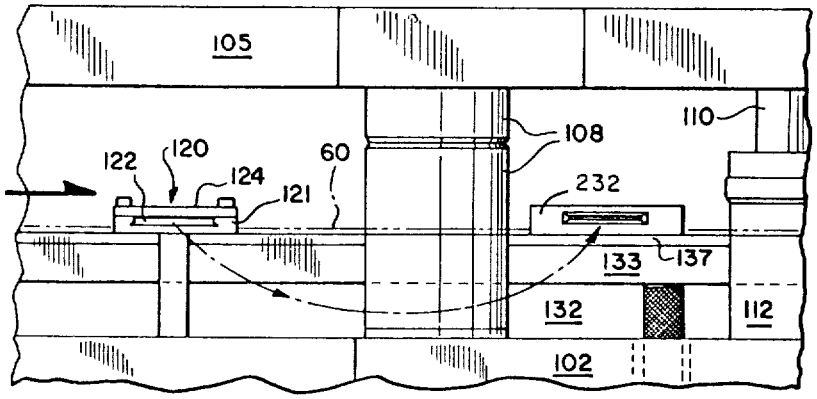
FIG. 19 is a view showing the relationship of the bed, slide, tool mounting blocks and stop blocks to the tab strip bridge and the tab transfer station.

Referring to FIGS. 10 and 19, in the end conversion tooling, at the point where the tab forming tooling intersects with it, there is provided a bridge 120 which receives the strip of partially formed tabs and carries them across the end conversion tooling into the remainder of the tab tooling located to the front side of the conveyor. The bridge consists of a bottom plate 121 with a front to back extending slot 122, and a cover 124 fitted to the strip and secured by suitable fasteners to its sides, whereby the slot 122 provides a closed passageway for a strip of material (later described) from which tabs are being formed.

Thus, as particularly shown in FIGS. 3 and 6, the stations of the end conversion tooling, along with the conveyor, define a side-to-side end conversion path, while the tab forming tooling defines a tab forming path in a front-back direction that is transverse to and crosses the end conversion path, then loops back to carry the tabs into the transfer/stake station. The symmetrical relationship of the tooling to the bed and slide can be observed in FIG. 3, by comparing the outline of the tooling subplate 100 to the side frame uprights 12-15 within which the slide reciprocates. The reaction forces on the slide and bed during closing and working of the tooling are distributed in approximately uniform fashion over the area of the slide and the underlying bed. This permits maximizing the loading on the press and enables two-out production of ends in a press typically having a rated capacity of forty-five tons (U.S.).

Figure 11:
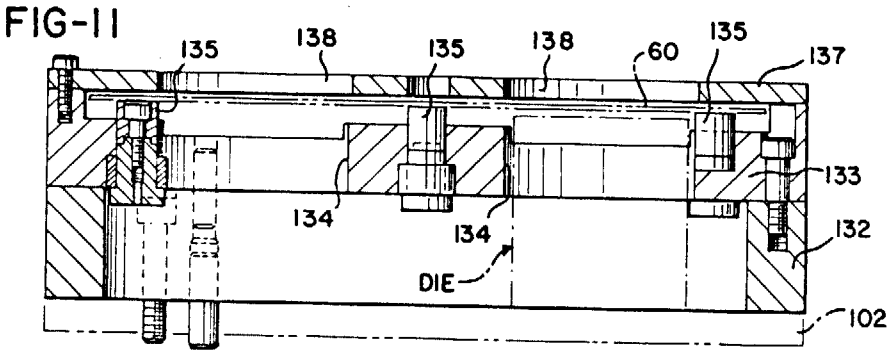
FIG. 11 is a cross-sectional view of one of the end conversion tooling stations, showing the relation of the conveyor belt and the vacuum box.

To retain the shells in position on conveyor 60, as they are located at the successive end conversion stations, the die (lower) parts of the end conversion tooling are located in vacuum boxes 130, which are shown in outline form in FIG. 3 and in greater detail in FIGS. 10 and 11. These comprise a lower generally rectangular frame 132 bolted to die shoe 102, and an upper frame 133 bolted to the lower frame. At each station the upper frame has circular openings 134 which surround the dies, and support rails 135 are bolted to the upper frame, extending along the end conersion path and providing support, at both sides and the center, to the underside of conveyor 60. A top plate 137 is bolted to upper frame 133 and is provided with circular openings 138 corresponding to openings 134.

The top plate thus also functions as a cover for the vacuum box, encloses the center and side edges of the conveyor, and the openings provide passage for the upper (punch) end conversion tools. When the interior of the boxes 130 is connected to a source of vacuum (not shown) and shells or partially converted ends rest in each of the carrier openings 62, the rails 135 together with the transverse end parts of upper frame 133 provide a moving seal over which the stainless steel conveyor belt slides, and the vacuum holds the ends firmly on the belt.

Shell Feed/End Discharge

Figure 15:
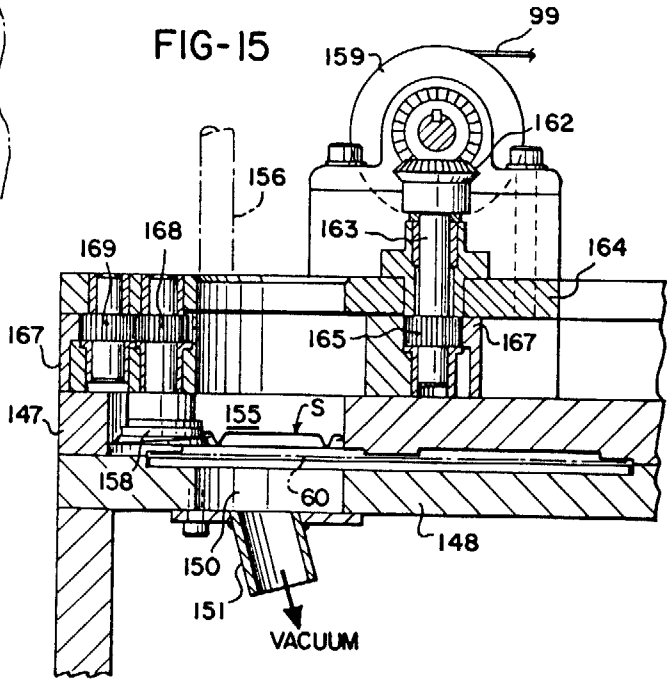
FIG. 15 is an enlarged sectional view taken on line 15—15 of FIG. 13.
Figure 13:
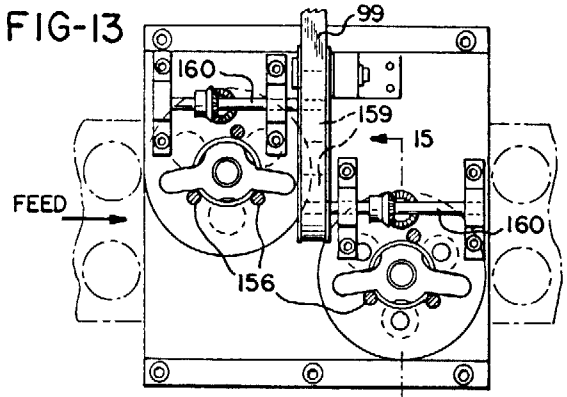
FIG. 13 is a plan view of the loading or down-stacker mechanism.
Figure 14:
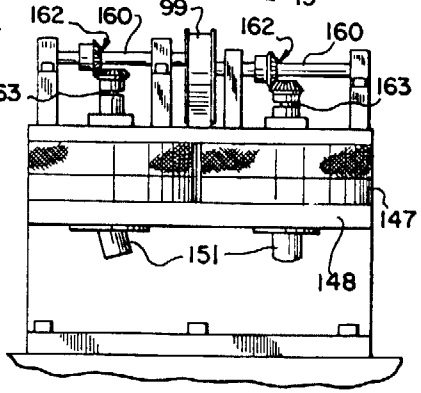
FIG. 14 is a side view of the loading mechanism.

The shell feeding mechanism 65, sometimes referred to as a downstacker, has been mentioned earlier with respect to its general function, and its location on the press (FIG. 3). Additional details of a suitable mechanism are shown in FIGS. 13, 14 and 15. This mechanism is per se known, but a brief description of it is desirable to appreciate its function in the present invention.

There are two mechanisms, each designated by the general reference numeral 145, one each of which is mounted over the conveyor lanes I and II. For simplification only one will be described. The base plate 147 holds both mechanisms, and is mounted over conveyor 60, outside of the left side frame (FIG. 3). A bottom plate 148, to which the base plate is bolted, includes a vacuum chamber 150 to which a vacuum hose fitting 151 is attached. Plates 147 and 148 are recessed (FIG. 15) to define a shallow passageway 153 receiving the conveyor belt 60.

Above chamber 150 there is a circular feed opening 155, of a diameter just large enough to pass the shells S which descend from a stack thereof contained within three guide rods 156. The lowermost shell S has its lip supported on the feeding threads of three feed screws 158, spaced around openings 155 such that 360° rotation of these screws will carry the lowermost shell from the stack and deposit the shell in a belt carrier opening 62 located beneath the feed opening 155.

The power and timing for the feed screw rotation is derived from belt 99, which is driven from power takeoff shaft section 75d as earlier described. Belt 99 wraps over and drives pulleys 159 which are fixed to short feeder-shafts 160 that are supported in suitable bearing blocks above the base plate 147. Bevel gear sets 162 transfer power to vertical shafts 163 which are mounted in suitable bushing (FIG. 15) in circular top plates 164. Pinions 165, on the shafts 163, mesh with internal gears 167, and pinions 168 on the feed screws 158 are driven from the internal gears through idler gears 169. Thus, by proper selection of pulley sizes and gear sizes, teeth numbers, and ratios, the intermittent rotation of the shaft 75 is translated into 360° rotations of feed screws 158, and a single shell is deposited in a carrier opening 62 as those openings halt under the feed opening 155.

Figure 16:
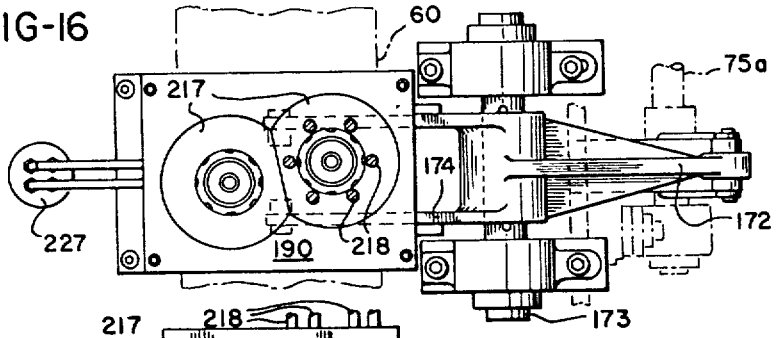
FIG. 16 is a plan view of the unloading or up-stacker mechanism.
Figure 17:
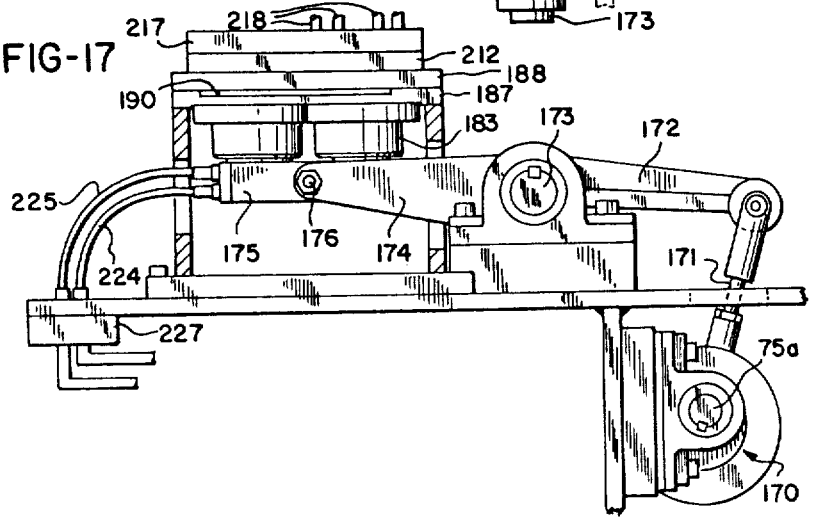
FIG. 17 is a side view of the unloading mechanism.
Figure 18:
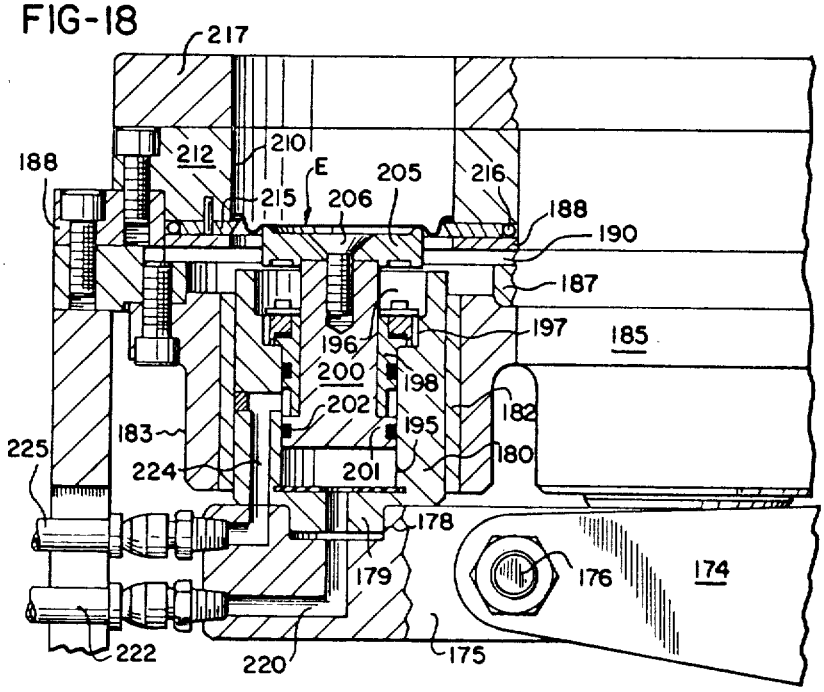
FIG. 18 is an enlarged cross-sectional view showing details of the unloading mechanism.

At the other side of the press, beyond the right side frame opening 17 (FIG. 3) the unloading or upstacker mechanism 68 is mounted above and below the conveyor belt 60. FIGS. 16, 17 and 18 show details of this mechanism, which also is per se known.

The first power takeoff shaft 75a has an eccentric or cam 170 thereon (FIGS. 3 & 17) which is coupled to oscillate a rod 171. The end of rod 171 is pinned to a rocker arm 172 which is supported by a bearing mounted stub shaft 173. The rocker arm includes a set of parallel arms 174 which straddle a piston carrier block 175, and fasten to the block through a cross-pin 176.

The mechanisms on the block 175 are duplicated for each unloading station in lanes I and II, hence only one mechanism is hereafter described. The block has a recess 178 which receives an extension 179 of a primary piston 180 that is reciprocably retained in a sleeve 182. This sleeve is mounted within a boss 183 on a sub-plate 185, which in turn is bolted to the lower plate 187 of the mechanism. An upper plate 188 is fastened to, and cooperates with, the lower plate 187 to define a passageway 190 for the upper flight of converyor 60, on which are carried the finished ends; one of these is shown at E, being removed from the conveyor.

The upper end of primary piston 180 extends, in its fully raised position (shown in FIGS. 17 and 18) into an opening 192 formed into lower plate 187 and receiving the upper edge of boss 183. In this position, however, the top of the primary piston 180 is below the conveyor passageway 190.

The center of piston 180 has a central bore 195, an upper cavity 196 in its head, and a counterbore 197 therebetween in which is fastened a gland member 198. A secondary piston 200 is supported in the gland and has a lower head 201, with an O-ring seal 202, slidable in bore 195. A secondary head 205 is secured to the top of piston 200 by a machine screw 206, and is sized to fit within cavity 196 on top of gland member 198.

The upper surface of head 205 is designed to engage an end E, as shown, and lift the end from the conveyor, thrusting it upward into a receiver opening 210 within the base plate 212 of the upstacker storage. A plurality of laterally sliding fingers 215 extend inward of opening 210, at its interface with plate 188. These fingers are urged inward by a garter spring 216, and the fingers will yield to the pressure of the flange on an upwardly thrust end E, to capture the end at the bottom of a stack thereof formed in opening 210. The stack of ends can rise through a corresponding opening in top plate 217, and into magazines defined by upwardly extending rods 218 (FIGS. 16 and 17).

Referring to FIG. 18, the chamber 195 in the primary piston is connected via passages 220 to a flexible hose 222. Similarly, the space between gland members 198 and the top of lower head 201 is connected via passages 224 to a flexible hose 225. Air (or other fluid) under pressure can be applied to one of these hoses and evacuated from the other, under control of a suitable valve shown schematically at 227 (FIG. 17).

This causes the secondary piston 200 to rise to its active position as shown in FIG. 18, or to retract to an inactive position within cavity 196. In the active position each stroke of the pistons will lift ends from conveyor 60 and thrust the ends into the receiver openings of the magazines. If the secondary piston is retracted, the ends on the conveyor will not be touched, and the next increment of conveyor movement will carry them past the discharge mechanism 68.

In the preferred embodiment of the invention, acceptable finished ends are thrust up into the stacks, while detected unacceptable ends are carried to and discharged over drum 55. This arrangement can readily be reversed, however, merely by having suitable fault detectors (not shown) actuate the valve 227 in the opposite fashion. In such case only rejected ends will be raised into the magazines, and acceptable ends can discharge over drum 55 into any suitable collection device.

Tab Tooling and Attachment

As previously mentioned the tabs T (FIG. 8) are formed from a strip 115 of aluminum or like material, supplied from a roll 116 and directed along the tab forming path which is transverse to the end conversion path and generally along the transverse center line of the press (see FIGS. 3 and 10). This strip is advanced through the tab forming tooling and the bride 120 over the conversion tooling, forms a reverse loop 230 (FIGS. 2, 3 and 6), passes back through the guide 232 (FIG. 19) into the stations I-G, II-G, and the remaining scrap strip is cut into suitable pieces and discharged.

FIGS. 4 and 5 show the incremental strip feeding mechanisms 235A and 235B which are driven in incremental fashion from belts 88. These feeding mechanisms are identical and commercially available from Ferguson Machine Co. under the name Camtrol roll rod. Essentially, these mechanisms receive intermittent rotary input from the power take-off shaft 75, gear box 80, and belts 88, and provide intermittent rotary feed output to feed rollers 236, between which the strip 115 is threaded. Pressure adjustment devices 237 control the pressure of the rollers 236 against the strip. Thus, strip 115 is withdrawn from roll 116 by the mechanism 235A, passes through the tab forming tooling and transfer/-stake station, and discharges through a guillotine cutter 240. The cutter or chopper is driven by a rocker arm 241 and connecting rod 242 which is reciprocated by a cam 243 mounted to the end of shaft 85.

The strip 115 is thereby fed in push-pull fashion through the looped path shown in FIG. 6. Two lanes of tabs T-I and T-II are formed in the strip, through the steps shown and noted in FIG. 8. These tabs, remain attached to the strip at the connection Tc, and are carried around the loop into the transfer/stake station I-G and II-G. It will be noted that center lines of the two tab lanes align with the centers of the ends located at the station; these centers are indicated by crosses on FIG. 10.

In known manner, the rivet holes in the tabs located at this station are thus aligned with the button or rivet on the ends, and as the connections Tc are severed, the tabs are set onto the ends. Complete closing of the tooling finishes the attachment by staking the rivets to form the well-known integral rivet attachment between the tabs and ends. After the next fooling station operation (H) the end conversion is complete and the ends proceed to the unloading mechanism. The remainder of the strip 115 proceeds to the cutter 240, where the strip is cut into short lengths as it is fed incrementally. These scrap lengths can be suitably collected for reclaiming, in known fashion.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. In a press for producing easy-open ends for cans and the like, said press having a rectangular bed, a corresponding rectangular slide, vertical guide means attached to said bed and confining said slide to motion toward and away from said bed, drive means connected to said slide to reciprocate said slide toward and away from said bed, said press having a front and a back [at the longer dimensions of said bed and slide] and opposite sides [at] *with* the shorter dimensions of said bed and slide *in the front/back direction*; the improvement comprising conveyor means extending through said sides of said press and *having an upper flight* adapted to carry shells for processing into can ends, upper and lower main tooling means supported on said slide and said bed respectively and located [at the top and bottom] *above and below said upper flight* of said conveyor means, said tooling means defining a plurality of stations on opposite sides of the center of the press for working progressively on shells located at each of said stations, first and second tab tooling means auxiliary to said main tooling means and also located on said slide and said bed on opposite sides of said conveyor means and adapted to form opening tabs from a strip of metal stock fed thereinto in the front/back direction, means for guiding a strip of stock into said tab tooling means, means for guiding the completed tabs from said tab tooling means to one of said stations along said conveyor means for attachment to the shells.

2. Apparatus as defined in claim 1, wherein said drive means includes a crankshaft extending from side to side across the top of the press, said main tooling means *being approximately centered on said bed and extending side to side thereof* and said tab tooling means being [located generally symmetrically to a vertical plane] *approximately centered on said bed and* extending *front to back* through the press [and the crankshaft].

3. Apparatus as defined in claim 2, wherein said tab tooling means is provided with a gap bridging said main tooling means, and means guiding the partially completed tab strip across said gap.

4. Apparatus as defined in claim 1, including means on said conveyor means defining carriers for shells moving along separate parallel lanes through said main tooling means.

[5. Apparatus as defined in claim 4, wherein said stations of said main tooling means are distributed symmetrically over the area of said bed and slide to maximize usage of the rated tonnage of the press.]

6. In a press for producing easy-open ends for cans and the like, said press having a rectangular bed and a corresponding rectangular slide and vertical guide means confining said slide to motion toward and away from said bed, drive means for reciprocating said slide toward and away from said bed, said press having a front and a back [at the longer dimensions of said bed and slide] and opposite sides [at] *with* the shorter dimensions of said bed and slide *in the front/back direction;* the improvement comprising cooperating upper and lower main tooling means mounted on said slide and said bed respectively, said main tooling means defining a plurality of stations on opposite sides of the center of the press for working progressively on shells located at each of said stations, cooperating first and second tab tooling means auxiliary to said main tooling means and also mounted on said slide and said bed respectively to form opening tabs from a strip of metal stock fed therein into in the front/back direction,

*said main tooling means and said tab tooling means being arranged on said bed and said slide in a manner to approximately equilibrate the reaction forces thereon during operation of said main and tab tooling,* means for guiding a strip of stock into said tab tooling means, means for guiding the strip with completed tabs from said tab tooling means back into one of said stations of said main tooling means for removal of the tabs from the strip and attachment to the shells, conveyor means *including an upper flight* extending through said sides of said press *across said tab tooing means and* between said *main* tooling means to carry shells for processing into can ends, *said first and second tab tooling means being located on opposite sides of said conveyor means,* and means operated by said drive means for incrementally moving said conveyor means through said main tooling means and for advancing a strip of metal stock through said tab tooling means in synchronism with movement of said slide.

7. A press as defined in claim 6, wherein said main tooling means *is approximately centered on said bed and extending side to side thereof* and said tab tooling means [are located generally symmetrically to a vertical plane] *is approximately centered on said bed and* extending [through] *front to back of* the press [bed and slide].

8. A press as defined in claim 6, wherein said tab tooling means is provided with a gap bridging said main tooling means, and means for guiding a partially completed tab strip across said gap.

9. A press as defined in claim 6, including apertures in said conveyor means defining carrier receivers for shells located along *at least* a pair of separate parallel lanes through said main tooling means.

10. Apparatus as defined in claim 6, wherein said stations of said main tooling means *and said tab tooling means* are distributed symmetrically over the working area of said bed and slide to maximize usage of the rated tonnage of the press.

[11. In a press for producing self opening ends for cans and the like, said press having a crown, a rectangular bed and a rectangular slide, and guide means extending between said bed and crown at the narrower sides thereof to guide said slide in motion toward and away from said bed, drive means mounted on said crown and connected to said slide to reciprocate said slide toward and away from said bed;

the improvement comprising conveyor means extending through said guide means for carrying shells for processing into easy opening can ends, upper and lower main tooling means supported on said slide and said bed respectively and located at the top and bottom of said conveyor means, said tooling means defining a plurality of stations on opposite sides of the center of the press for working progressively on shells located on said conveyor means at each of said stations, first and second tab tooling means auxiliary to said main tooling means and also located on said slide and said bed extending to the front and back of said main tooling means and adapted to form opening tabs from a strip of metal stock fed therethrough, means for guiding a strip of stock through said tab tooling means, means for guiding a strip carrying completed tabs from said tab tooling means in the back/front direction and back to one of said stations for attachment to the shells, and means at said one station for detaching completed tabs from the strip.]

12. In a press for producing easy-open ends for cans and the like, said press having a rectangular bed, a corresponding rectangular slide, said frame members at the shorter dimensions of said bed and slide including vertical *uprights and* guide means confining said slide to motion toward and away from said bed, said side frame members having openings therethrough located above said bed and below the raised position of said slide, said press having a front and a back [at the longer dimensions of said bed and slide] *extending between said side frame members,* drive means connected to said slide to reciprocate said slide toward and away from said bed, the improvement comprising an endless conveyor belt extending through said openings in said side frame members and having an upper [level] *flight* adapted to carry shells for processing into easy open can ends, upper and lower main tooling means supported on said slide and said bed respectively and located along and [at the top and bottom] *above and below said upper flight* of said converor means, said tooling means cooperatively defining an end converting path with a plurality of stations at the level of said upper flight and on opposite sides of the center of the press for progressively converting shells located at each of said stations into can ends, upper and lower tab tooling means also supported on said slide and said bed and extending to the front and back of said press on opposite sides of said conveyor belt defining stations of a tab forming path along which opening tabs are formed from a strip of metal stock fed therealong, means for guiding a strip of stock through said tab tooling means, means for guiding the completed tabs from said tab tooling means to one of said stations of the end converting path for attachment to the shells.

13. Apparatus as defined in claim 12, said tab tooling means including a bridge member extending across said conveyor belt.

[14. Apparatus as defined in claim 12, including means on said conveyor belt defining carriers for shells extending along a plurality of parallel lanes through said main tooling means.]

[15. Apparatus as defined in claim 12, wherein said stations of said end converting path and said tab forming path are distributed symmetrically over the area of said bed and slide to maximize usage of the rated tonnage of the press.]

16. Tooling for use in a press for converting ends for cans and the like, comprising conveyor means extending sideways through the press and adapted to carry shells for processing into can ends along an end converting path, upper and lower main tooling means located along the end converting path [at the top and bottom of] *above and below* said conveyor means and defining a plurality of stations on opposite sides of the center of the tooling means for working progressively on shells moved by said conveyor means along the end converting path,

*a punch holder plate supporting said upper main tooling means,*

*a subplate supporting said lower main tooling means,* first and second tab tooling means axuiliary to said main tooling means and located on opposite sides of said conveyor means extending transversely thereof and defining a tab forming path which bridges the end converting path and along which opening tabs are formed from a strip of metal stock fed thereinto,

*said first tab tooling means being secured to and supported by said punch holder plate,*

*said second tab tooling means being secured to and supported by said subplate,* means for guiding a strip of stock through said tab tooling means, and means for guiding the strip with completed tabs from said tab tooling means back to one of the stations on the end converting path for removal from the strip and attachment to the shells.

* * * * *